June 23, 1925.
M. NEWBOULD
1,543,478
MEANS FOR PREVENTING UNCONTROLLED BACKWARD
MOVEMENT OF AUTOMOBILES AND THE LIKE
Filed Nov. 30, 1923
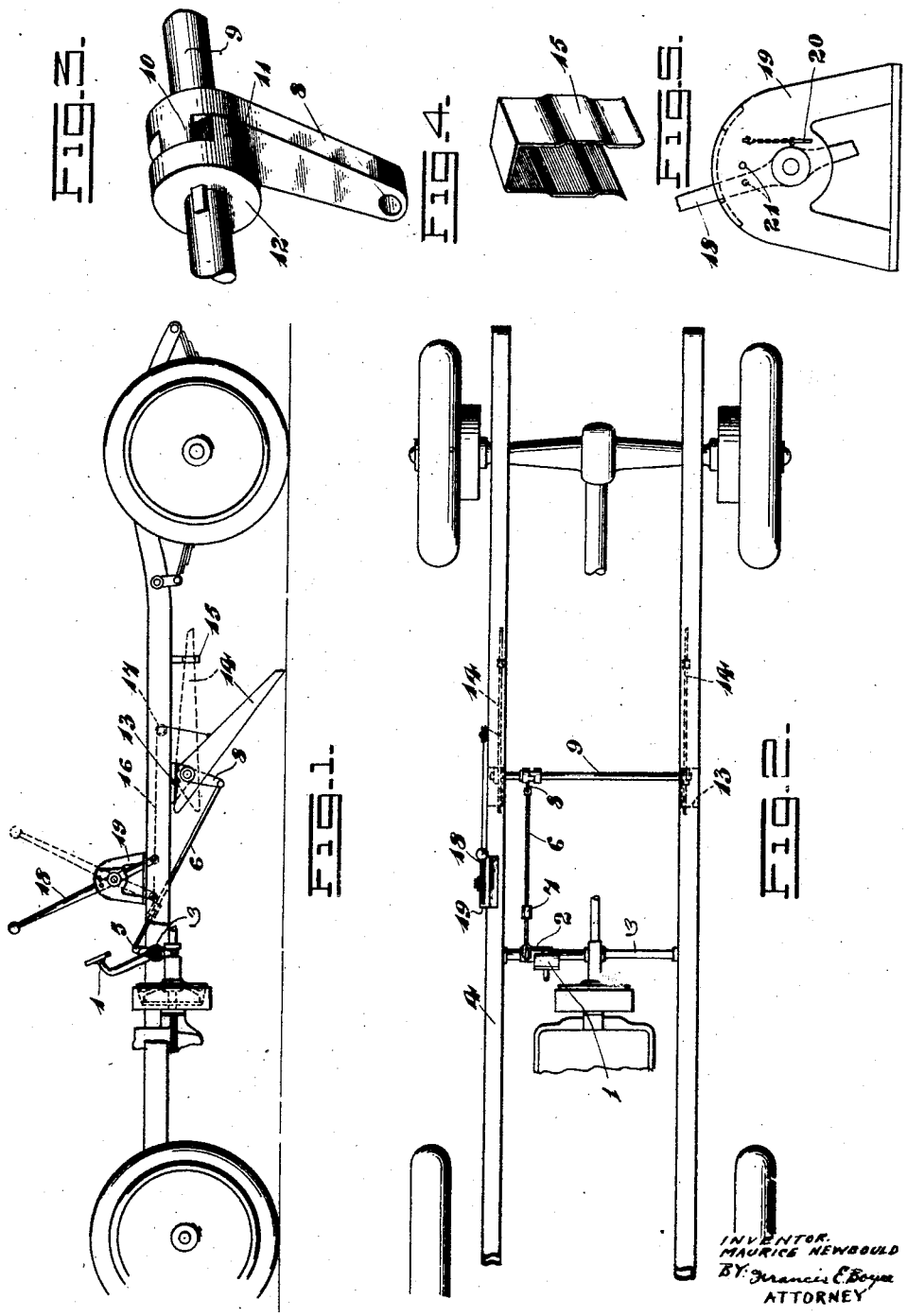

Patented June 23, 1925.

1,543,478

UNITED STATES PATENT OFFICE.

MAURICE NEWBOULD, OF PETERBOROUGH, ENGLAND.

MEANS FOR PREVENTING UNCONTROLLED BACKWARD MOVEMENT OF AUTOMOBILES AND THE LIKE.

Application filed November 30, 1923. Serial No. 677,638.

*To all whom it may concern:*

Be it known that I, MAURICE NEWBOULD, a subject of the King of Great Britain, residing at York House, Allen Road, Peterborough, Northamptonshire, England, have invented a new or Improved Means for Preventing Uncontrolled Backward Movement of Automobiles and the like, of which the following is a specification.

This invention comprises new or improved means for preventing uncontrolled backward movement of automobiles and the like.

It is well known that when an automobile is being driven up a hill having a comparatively steep gradient, it is customary to change the speed gear to a lower ratio, which is accomplished by first depressing the clutch pedal to disengage the clutch and then operating the gear lever to lower the gear. If, however, when the clutch is thrown out, the momentum of the car is not sufficient to keep said car travelling forward until the gear is changed and brought into driving engagement, the possibility exists that the car will commence to run backwards down the incline in an uncontrolled manner, and damage may result before the driver can regain proper control.

The object of this invention is to obviate the possibility of this occurring, and with this object in view the principal feature of the invention consists in the provision of means whereby when the clutch is thrown out of engagement by depressing the customary clutch pedal or other means, one or more devices or members are automatically brought into operation to positively retain the vehicle from reversing.

Another feature consists in the provision of a device which by the customary movement of the clutch pedal or lever to effect declutching is operated to positively retain the automobile from backward movement, said device being unaffected by the return movement of said pedal or lever, additional means being provided for returning the device to its normal inoperative position.

A further feature consists in the provision upon an automobile of one or more pivoted arms or the like which, when the clutch pedal or lever is operated to release the clutch, is or are moved so as to come into engagement with the ground and prevent rearward movement of the vehicle.

A still further feature consists in the provision in connection with the above mentioned pivoted arms or the like of spring means for releasably retaining said arms in the inoperative position.

Further features will be hereinafter more fully described.

For the purpose of more fully describing the nature of this invention, reference will now be made to the accompanying drawings, wherein:—

Fig. 1 illustrates in side elevation one embodiment of the invention fitted upon an automobile chassis, the pivoted prongs being shown in full lines in the operative position and in broken lines in the inoperative position.

Fig. 2 is a plan of Figure 1 with the prongs in the inoperative position.

Fig. 3 is a perspective detail view on an enlarged scale.

Fig. 4 shows a suitable form of spring clip for holding the pivoted prongs raised.

Fig. 5 is a detail view showing more clearly means for retaining the prongs inoperative while permitting free use of the clutch pedal.

In a convenient method of carrying out the invention the customary clutch pedal 1 is connected to a sleeve 2 rotatably mounted on a transverse spindle 3 fixed to the chassis 4, and on said rotatable sleeve 2 is provided a short upstanding arm 5 to the upper end of which is pivotally jointed a rearwardly extending rod 6, the length of which may be adjustable by dividing same and providing a screwed union 7 at the division. This rod 6 inclines downwardly from front to rear and is freely jointed at its rear end to the lower end of a short arm 8, which arm projects downwardly from and is rotatably mounted upon a shaft 9 extending transversely across the width of the chassis 4, said shaft 9 being itself rotatably mounted within suitable bearings carried by the chassis.

On the one side face of the upper end of the downwardly extending arm 8 rotatably mounted on the transverse shaft 9 is formed a laterally projecting lug 10 or the like, which lug is adapted in the operation of the invention to come into contact with a similar lug 11 projecting laterally from a collar 12 which is keyed or otherwise immovably fixed upon the transverse shaft 9 at the side of the arm 8.

The end bearings 13 for the rotatable transverse shaft 9 are preferably bolted beneath the longitudinal side frame members of the chassis 4, and adjacent to each of said bearings on the outer or inner side thereof is provided an arm or prong 14 keyed or otherwise fixed to the shaft, the lower free end of said prongs being preferably pointed. If desired the prongs 14 may be mounted between the flanges of inverted channel bearings.

When the clutch pedal 1 is depressed for the purpose of releasing the clutch and changing the gear, the sleeve 2 carrying said pedal is rotated so as to draw the rearwardly extending rod 6 longitudinally forward, and by reason of the engagement between the lateral lug 10 on the short arm 8 to which the rear end of this rod 6 is jointed and the lug 11 on the collar 12 fixed to the transverse shaft 9 carrying the pointed arms or prongs 14, said latter members are forced out of a position in which same are retained suspended within spring clips 15 carried by the chassis 4 and are allowed to fall by gravity into a position inclining rearwardly downwards with their pointed ends upon the ground, thus rocking the shaft 9 and carrying the lug 11 out of contact with lug 10, so that the clutch pedal may be further depressed without effect on the prongs 14. The upper end of each prong 14 may be formed with a flat face adapted to bear upon the underface of the bearing base plate 13 or upon the chassis frame 4 when the prongs are lowered.

The spring clips 15 which releasably retain the prongs 14 in the raised position may be of approximately inverted U formation as shown in Figure 4, shaped to grip said arms.

When the clutch pedal 1 is raised, the rearwardly extending rod 6 moves back to its normal position without moving the transverse shaft 9 and the prongs 14 carried thereby, the aforedescribed lugs 10 and 11 simply moving apart out of engagement with each other.

To raise the prongs into the inoperative position separate means are provided such as a flexible wire or cord 16 attached to each prong passing over one or more pulleys 17 and extending forward to a suitable control lever or member 18 within easy reach of the driver. For example, said wire 16 may be attached to the lower end of a pivoted lever working within the gate of a fixed quadrant 19.

A lateral branch may be formed in the gate of the quadrant 19 so disposed that when it is desired to reverse the vehicle, the lever 18 can be moved into said branch so as to retain the pointed prongs 14 just clear of the ground and permit of the clutch pedal 1 being operated without affecting said prongs. This may, however, be effected by inserting a peg or pin 20 through holes 21 the quadrant and lever, (Fig. 5).

If desired the two prongs 14 may each be connected to the ends of shaft 9 by a dog clutch arrangement which would operate to move the prongs only when the shaft is rotated in one direction by the depression of the clutch pedal 1. In this way each prong would have independent movement and allow for inequalities in the height of the ground when said prongs are lowered. In this arrangement the short arm 8 to which the rearwardly extending rod 6 from the clutch pedal is jointed may be keyed or otherwise fixedly connected to the transverse shaft 9.

It is to be understood that the invention is not restricted to the particular arrangements hereinbefore described, as same may be varied in many ways without departing from the scope of the invention.

I claim:—

1. The combination in an automobile, of a clutch-operating mechanism, one or more members suitably connected with said clutch-operating mechanism and adapted by the operation of said mechanism when effecting declutching to be moved into contact with the ground and prevent backward movement of the vehicle, and means for returning said members to their inoperative position.

2. The combination in an automobile of a clutch pedal, one or more pivoted gravity members, spring clips for retaining said gravity members in the raised inoperative position, connecting means between said clutch pedal and gravity members which cause said members to be released from said clips and fall into contact with the ground when the pedal is depressed for declutching, and independently controlled means for raising said gravity members.

3. In an automobile having a clutch for connecting the engine with and disconnecting same from the driving gear, and a pedal for operating said clutch, the combination of a transverse shaft so connected to the pedal as to be rotated by the operation of said pedal, gravity prongs carried by said shaft, spring clips for normally retaining said prongs raised, said prongs being released from said clips so as to fall by gravity into contact with the ground by the depression of the pedal when declutching, and a cable connection to said prongs controlled by independent lever for raising same to the inoperative position.

4. In an automobile, having a clutch, and a clutch pedal, the combination of gravity members mounted on fixed pivots, clips for releasably retaining the gravity members in the raised inoperative position, connecting means between said members and the clutch pedal whereby the depression of said pedal when declutching releases the gravity members and permits same to fall into the operative position for preventing backward movement of the vehicle, an independent lever and cable device for raising the gravity members and means whereby said gravity members can be rendered inoperative and unaffected by the operation of the clutch pedal.

MAURICE NEWBOULD.

Witnesses:
　ERIC TOLLER,
　WILLIAM JAMES NEWBOULD.